United States Patent
Wilson et al.

(10) Patent No.: US 9,037,917 B2
(45) Date of Patent: May 19, 2015

(54) AUTOMATED LINE TEST ACTION AND MONITORING SYSTEM

(71) Applicant: AT&T Intellectual Property I, L.P., Atlanta, GA (US)

(72) Inventors: Christopher Wilson, Arnold, MO (US); Keith Bertelsen, St. Louis, MO (US); Bruce Losee, Concord, CA (US); Kavitha Shankar, Saratoga, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 195 days.

(21) Appl. No.: 13/705,791

(22) Filed: Dec. 5, 2012

(65) Prior Publication Data

US 2014/0153626 A1    Jun. 5, 2014

(51) Int. Cl.
- *G06F 11/00* (2006.01)
- *H04B 3/46* (2006.01)
- *G06F 11/22* (2006.01)
- *H04L 12/26* (2006.01)
- *H04M 3/30* (2006.01)

(52) U.S. Cl.
CPC .............. *H04B 3/46* (2013.01); *G06F 11/2252* (2013.01); *G06F 11/2257* (2013.01); *G06F 11/006* (2013.01); *H04L 43/50* (2013.01); *H04M 3/30* (2013.01)

(58) Field of Classification Search
CPC G06F 11/2252; G06F 11/006; G06F 11/2257
See application file for complete search history.

(56) References Cited

U.S. PATENT DOCUMENTS

| | | | |
|---|---|---|---|
| 5,864,563 A | 1/1999 | Ratcliffe | |
| 6,006,016 A | 12/1999 | Faigon et al. | |
| 6,209,108 B1 | 3/2001 | Pett et al. | |
| 6,418,160 B1 | 7/2002 | Miller | |
| 6,459,702 B1 | 10/2002 | Saaverda et al. | |
| 6,668,041 B2 | 12/2003 | Kamali et al. | |
| 6,889,339 B1 | 5/2005 | D'Amico et al. | |
| 6,901,530 B2 | 5/2005 | Cerami et al. | |
| 7,092,364 B1 | 8/2006 | Franklin et al. | |
| 7,106,833 B2 | 9/2006 | Kerpez | |
| 7,251,754 B2 * | 7/2007 | Maxwell | 714/43 |
| 7,272,209 B2 | 9/2007 | Jiang et al. | |
| 7,362,713 B2 | 4/2008 | Jiang et al. | |
| 7,577,189 B2 | 8/2009 | Bella et al. | |
| 7,602,885 B2 | 10/2009 | Afzal et al. | |
| 8,027,807 B2 | 9/2011 | May et al. | |
| 8,144,835 B2 | 3/2012 | Wu et al. | |
| 2004/0039957 A1* | 2/2004 | Maxwell et al. | 714/4 |
| 2007/0100782 A1 | 5/2007 | Reed et al. | |
| 2009/0217097 A1 | 8/2009 | Laperi et al. | |

* cited by examiner

*Primary Examiner* — Charles Ehne
(74) *Attorney, Agent, or Firm* — Toler Law Group, PC (57) ABSTRACT

A method includes identifying, at a computing system executing a line test engine, a line to be tested by comparing a test entry of a test configuration database to a first database. The first database includes line data descriptive of multiple lines of a network. The method includes determining, at the computing system, a test to be performed on the line based on the test entry and sending a message from the computing system to a line test controller. The message indicates the line and the test to be performed on the line. The line test controller causes a test device to perform the test on the line. The method includes receiving a result message from the line test controller, wherein the result message indicates a result of the test.

20 Claims, 5 Drawing Sheets

| Order Type | "Project" | CO Status | Market | Test |
|---|---|---|---|---|
| Change | Move Crossbox | Any | 1 | CO Voltage |
| Change | Convert Dry Loop | Any | 2 | None |
| New | All | Completed | 3 | VF Tone |
| New | Move Crossbox | Failure | 2 | CO Voltage |

| Test | Downtime Start | Downtime End | Time Between |
|---|---|---|---|
| CO Voltage | 2300 | 0400 | 5 |
| Loop Length | 1230 | 1700 | 30 |
| VF Tone | 0 | 0 | 20 |
| Load coils | 1800 | 0200 | 0 |

|  | Config. 1 | Config. 2 | Config. 3 | Config. 4 | Config. 5 |
|---|---|---|---|---|---|
| Market | 2 | 2 | 2 | 2 | 3 |
| Test | CO Voltage | Loop Length | Load Coils | VF Tone | CO Voltage |
| Lower Margin | 40 | 0 | 0 | 35 | 35 |
| Upper Margin | 50 | 1000 | 20 | 35 | 45 |
| Success | N/A | Load Coils | N/A | Loop Length | N/A |
| Failure | VF Noise | N/A | N/A | Load Coils | Line Voltage |
| Retry on Fail? | Y | N | N | Y | Y |
| Cust Care? | Y | Y | N | N | N |
| Outside Plant? | N | Y | Y | N | Y |
| CO Plant? | Y | N | N | Y | Y |

AUTOMATED LINE TEST ACTION AND MONITORING SYSTEM

FIELD OF THE DISCLOSURE

The present disclosure is generally related to a system for monitoring and testing communication systems.

BACKGROUND

In large networks, such as telephony networks, internet protocol television networks, cable networks, and other distributed networks provided by a centralized or decentralized service provider, maintaining equipment, such as subscriber lines, can be time consuming. Additionally, testing lines to provide new service via existing lines or to install new lines can be time consuming. For example, providing new service for particular customers can be time consuming because the provisioning of the service may need to be scheduled to coordinate with other activities, such as installing or replacing hardware on the subscriber network and/or testing various components of the subscriber network. Additionally, the testing may need to be performed in a particular order. For example, before testing of the lines is performed, additional hardware may need to be installed on the subscriber network to provide the service. Thus, the personnel installing the additional hardware may not be the same personnel responsible for testing the lines or the tests may need to be performed at a different location than where the additional hardware was installed.

DETAILED DESCRIPTION

Particular embodiments described herein enable centralized configuration of line tests in a manner that can be executed by a line test engine to coordinate line tests for a subscriber network. The line test engine can coordinate line tests for new installations of lines, for providing new service using existing lines, and for maintaining or function checking the existing lines. A configuration database is used to configure tests and to establish interrelationships between tests in a manner that facilitates functional testing of lines. The configuration database is also used to facilitate identifying and initiating corrective action when problems are identified with one or more of the lines.

Figure 1:
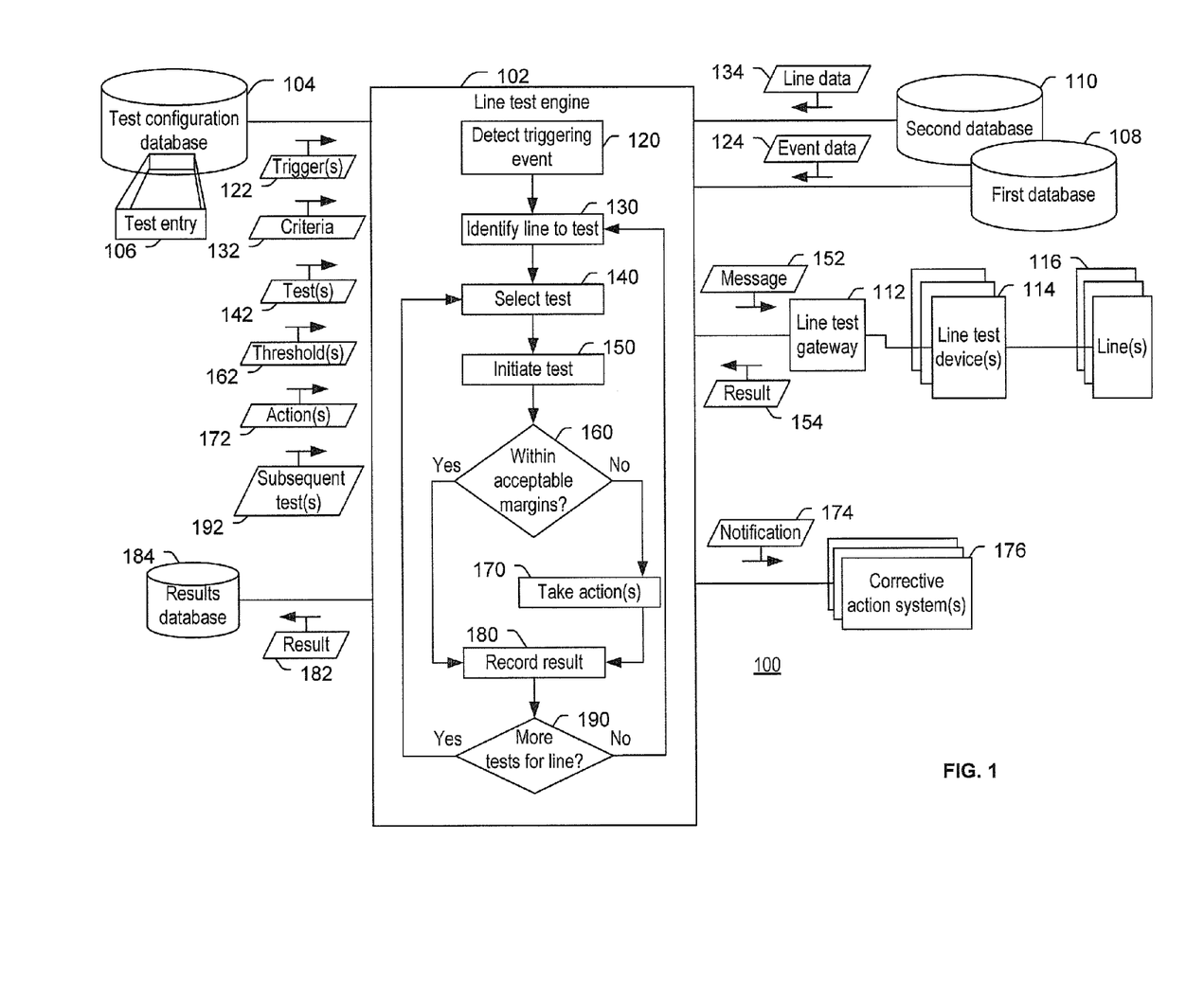
FIG. 1 is a particular illustrative embodiment of a line testing system of a network.

Referring to FIG. 1, a particular illustrative embodiment of a network 100 is shown. As shown in FIG. 1, the network 100 includes a plurality of lines 116 that are, or that, at a subsequent time, may be coupled to end user devices (not shown). The network 100 may be a communication network (e.g., a telephony or voice over internet protocol network), a media distribution network (e.g., a television network, such as a cable television network or an internet protocol television network), a data network (e.g., a network that provides internet access via digital subscriber lines, fiber, or coaxial lines), or a combination thereof.

The plurality of lines 116 are communicatively coupled to a line test engine 102. In an embodiment, the line test engine 102 may comprise software executed by a processor of a computing system that is communicatively coupled with the plurality of lines 116. The line test engine 102 is configured to control or perform automated line testing of the plurality of lines 116. The line test engine 102 is coupled to, or has access to, a test configuration database 104. The test configuration database 104 includes a plurality of test entries, such as a representative test entry 106. Each test entry (e.g., the test entry 106) includes configuration information associated with one or more tests that can be performed in an automatic manner by the line test engine 102 using one or more line test devices 114 coupled to the lines 116.

The line test engine 102 may also be coupled to, or have access to, a plurality of additional databases, such as a first database 108 that includes information descriptive of the plurality of lines 116. For example, the first database 108 may include subscriber information, a description of a physical configuration of the plurality of lines 116, a line identifier, other line data that is descriptive of the plurality of lines 116, or a combination thereof. Additionally, or in the alternative, the line test engine 102 may be coupled to a second database 110. The second database 110 may include additional or alternative information associated with the plurality of lines 116. For example, the second database 110 may include customer service information or maintenance information associated with the plurality of lines 116. The second database 110 may include a work order database, a central office completion database, a circuit completion system, or other stored data that indicates a status of one or more of the plurality of lines 116. For example, the other data may include a line status identifier or other status data indicating that a particular one of the plurality of lines 116 is complete or that the particular line is incomplete. As another example, the other data may include status data indicating a status of a work order or indicating a work order type associated with a particular line of the plurality of lines 116. The line test engine 102 may be configured to use information retrieved from the test configuration database 104, the first database 108, the second database 110, or a combination thereof, in order to automate line testing of the plurality of lines 116.

In a particular embodiment, the line test engine 102 may be coupled to a line test gateway 112. The line test gateway 112 may facilitate communication between the line test engine 102 and the line test devices 114. The line test devices 114 may be configured to perform, implement, or initiate one or more tests. The one or more tests may include a line voltage test, a central office (CO) voltage test, a voice frequency (VF) noise measurement test, a VF tone measurement test, a wideband noise measurement test, a wideband tone measurement test, a spectrum measurement test, a load coils test, a loop length test, a capacitive balance test, a facility voltage test, a facility resistance test, a facility current test, a facility capacitance test, other tests, or a combination thereof. For example, the line test gateway 112 may be adapted to receive a message from the line test engine 102, such as a test message 152. The test message 152 may indicate a particular test to be performed at a particular line of the plurality of lines 116. In response to receiving the test message 152, the line test gateway 112 may direct a particular one of the line test device(s)

114 to perform the particular test. The line test gateway 112 may also retrieve results of the particular test from the particular line test device of the line test device(s) 114 and provide the results to the line test engine 102 via a result message, such as a result message 154.

The line test engine 102 may also be coupled to one or more corrective action systems 176. The one or more corrective action systems 176 may include databases or other computing systems that coordinate repairs or other corrective actions with respect to one or more of the plurality of lines 116. For example, the one or more corrective action systems 176 may include a work order system, a technician management system, a technician dispatch system, a billing system, a line configuration system, or other systems that facilitate implementation of corrective actions when a problem is identified with a particular line of the plurality of lines 116. The line test engine 102 may be coupled to a results database 184. The results database 184 may be adapted to store results of automated line testing. For example, after a result message 154 is received at the test engine, the line test engine 102 may send a result message 182 corresponding to the result message 154 to the results database 184. In a particular embodiment, the result message 154 received from the line test gateway 112 includes information indicating the particular line test performed, a value (e.g., a number) indicating a result of the particular line test performed, and information that identifies the particular line. In this embodiment, the result message 182 sent to the results database 184 may include the value, may include information determined based on the value (e.g., whether the line passed the line test), or both.

In a particular embodiment, the line test engine 102 initiates automated line testing in response to detecting a triggering event, at 120. For example, the line test engine 102 may access or retrieve the test entry 106. The test entry 106 may include a set of triggers 122, a set of criteria 132, test configuration data 142, threshold data 162, action data 172, and subsequent test data 192. The set of triggers 122 may indicate when a particular test should be performed. Each of the triggers included in the set of triggers 122 may be associated with criteria, such as the criteria 132. The line test engine 102 may also access the first database 108 and/or the second database 110 to access event data, such as event data 124. For example, the event data 124 may indicate when one or more event triggers occur. To illustrate, an event trigger may be detected when the event data matches the criteria 132 associated with a particular trigger of the set of triggers 122.

For example, an event trigger may be associated with criteria corresponding to new services to be provided to a particular line of the plurality of lines 116. When the event data satisfies the criteria, a triggering event may be detected and the triggering event may be associated with a particular test to be performed on the particular line. Thus, the line test engine 102 may access the event data 124 to determine whether the event data 124 satisfies the criteria 132 (e.g., new services are being provided to the particular line) associated with a particular trigger and may determine a particular test to be performed on the particular line when the event data satisfies the criteria associated with the trigger of the set of triggers 122. Criteria, such as the criteria 132, are described further with reference to FIG. 2.

After detecting a triggering event, or concurrently with detecting the triggering event, the line test engine 102 may identify a line to test, at 130. For example, the line test engine 102 may access the first database 108, the second database 110, or both, to identify line data, such as the line data 134. The line data 134 may include information descriptive of a particular line of the plurality of lines 116. For example, the line data 134 may indicate that a particular line is associated with a new service installation. The line test engine 102 may determine that a particular line identified in the line data 134 is to be tested.

After identifying the particular line to be tested, or concurrently with identifying the particular line to be tested, the line test engine 102 may select a particular test (e.g., the test associated with the triggering event) to be performed on the particular line, at 140. For example, the line test engine 102 may access test configuration data, such as test configuration data 142, from the test entry 106. The test configuration data 142 may indicate one or more particular tests to be performed based on the line data 134 and the event data 124. For example, when a new service is to be installed on the particular line, the test configuration data 142 may indicate one or more particular tests that are to be performed. Any particular one or more of the one or more tests to be performed may be selected, at 140. As another example, when a new service is to be provided within a particular region or geographic area, the test configuration data 142 may indicate the one or more particular tests that are to be performed. Accordingly, the line test engine 102 may select one or more tests to be performed based on the test configuration data 142, the line data 134, the event data 124, the triggers 122, the criteria 132, or a combination thereof.

After selecting the one or more particular tests to be performed on a particular line of the plurality of lines 116, the line test engine 102 may initiate testing of the particular line, at 150. For example, the line test engine 102 may initiate the testing by sending a message, such as the test message 152, to the line test gateway 112. The test message 152 may identify the particular line to be tested and may indicate one or more tests to be performed on the particular line. The line test gateway 112 may cause a particular test device of the line test devices 114 to perform the one or more tests on the particular line of the plurality of lines 116. In a particular embodiment, the line test device 114 may generate a result that is provided to the line test gateway 112 in a particular format. The particular format may be determined based on the particular test performed, the specific line test device that performed the test, or both. In a particular embodiment, the particular format of the result corresponds to a numeric output value that indicates an outcome of the particular test (e.g., a voltage measured, a line length, a tone frequency, or another value). The line test gateway 112 may adapt the result to a result message 154 for use by the line test engine 102. For example, the line test gateway 112 may modify a format of the result to generate the result message 154 and may provide the result message 154 to the line test engine 102.

After receiving the result message 154, the line test engine 102 may determine whether the result (e.g., the numeric output value) is within acceptable margins, at 160. For example, the line test engine 102 may access threshold data, such as the threshold data 162, from the test entry 106. The threshold data 162 may include a maximum acceptable (e.g., passing) numeric output value, a minimum acceptable (e.g., passing) numeric output value, or both. For example, the line test engine 102 may perform a comparison of the numeric output value(s) included in the threshold data 162 with the numeric output value included in the result message 154. The maximum acceptable output value and the minimum acceptable output value (of the threshold data 162) may indicate an acceptable margin for the numeric output value included in the result message 154. At 160, the line test engine 102 may determine whether the numeric output value included in the result message 154 is within the acceptable margin (e.g., the numeric output value is equal to the maximum acceptable output value, the numeric output value is equal to the minimum acceptable output value, or the numeric output value is between the maximum acceptable output value and the minimum acceptable output value).

When the numeric output value indicated by the result message 154 is within the acceptable margins, the result message 154 may indicate that the particular line is operable to provide the service at an acceptable quality of service level. When the numeric output value indicated by the result message 154 is not within the acceptable margins (i.e., the numeric output value is above the maximum acceptable output value or below the minimum acceptable output value), the result message 154 may indicate that the particular test failed and that the particular line is not operable to provide the service at the acceptable quality of service level. In this case, the line test engine 102 may initiate one or more corrective actions. For example, when the numeric output value indicated by the result message 154 satisfies a first threshold value (e.g., the numeric output value is less than the maximum acceptable output value) but does not satisfy a second threshold value (e.g., the numeric output value is less than the minimum acceptable output value), a particular action may be performed, at 170. However, when the numeric output value indicated by the result message 154 satisfies the second threshold value and does not satisfy the first threshold value, a different action may be performed, at 170.

The line test engine 102 may initiate a corrective action by sending a notification, such as the notification message 174, to one or more corrective action systems 176. The particular corrective action or the content of the notification 174 may be selected or determined based on action data 172 included in the test entry 106. In another example, the line test engine 102 may take corrective action by sending the notification message 174 to a designated recipient or group of recipients. The designated recipient or group of recipients may be indicated in the action data 172 of the test entry 106. Whether the results are within the acceptable margins, at 160, or not, the line test engine 102 may be configured to record the results, at 180. For example, the line test engine 102 may send the result message 182 to the results database 184. The result message 182 may indicate the numeric output value indicated by the result message 154, may indicate whether the particular line passed the test, may indicate whether the numeric output value was within the acceptable margins or not, may indicate whether particular corrective actions were taken, or a combination thereof.

The line test engine 102 may also be configured to determine whether one or more additional tests are to be performed for the particular line, at 190. For example, the test entry 106 may include subsequent test data 192 that indicates whether another test is to be performed for the particular line. For example, a subsequent test may be performed in response to determining that the particular line failed a first test (e.g., the particular test indicated in the test configuration data 142). In another example, a subsequent test may be performed in response to determining the line passed the first test. In another example, tests may be performed in a particular order and thus, one or more subsequent tests may be performed following the first test irrespective of whether the first test passed or failed. In a further example, a first test may be performed to identify whether a problem is detected within the particular line and a subsequent test may be performed to determine a source or a location of the problem after the first test identifies an existence of the problem. The first test and the subsequent test may both relate to the same characteristic of the particular line or may relate to distinct characteristics of the line. For example, the first test may be related to a line voltage of the particular line, and the subsequent test may be related to a length of the particular line. In this example, distinct characteristics (e.g., line voltage and line length) are associated with each test. In another example, the first test may be related to a voltage on the particular line at a particular location, and a subsequent test may be related to a voltage of the particular line at another location. In this example, each test is related to the same characteristic (e.g., a voltage of the particular line).

During operation, a subscriber or a potential subscriber may contact an operator of the network 100 to request access to a service provided via the network 100. The operator may create and store the event data 124 at the first database 108 in response to the request. The event data 124 may identify the service to be provided (e.g., the service requested), an address where the service is to be provided, a market area (e.g., a geographic region or area) where the service is to be provided, and other information (e.g., information identifying the subscriber).

The line test engine 102 may monitor event data stored at the first database 108 for information indicating that a test is to be performed on one or more of the plurality of lines 116. For example, during monitoring of the first database 108, the line test engine 102 may access the first database 108 to retrieve the event data 124 in response to detecting that the event data 124 has been created and stored at the first database 108. The line test engine 102 may then access the test configuration database 104 to retrieve test data, such as the test entry 106.

Based on the test entry 106 and the event data 124, the line test engine 102 may detect one or more triggers of the set of triggers 122. For example, the line test engine 102 may determine whether criteria associated with a particular trigger of the set of triggers 122 are satisfied based on the event data 124, as described with reference to FIG. 2. Further, the line test engine 102 may determine which test(s) are to be performed on one of the lines of the plurality of lines 116. The line to be tested corresponds to the line through which the service is to be provided to the subscriber. In a particular embodiment, the line to be tested may be determined based on the line data 134 and the event data 124. For example, the event data 124 may include the address where the service is to be provided. The line test engine 102 may determine, based on the line data 134, whether the network 100 includes the line to be tested (i.e., does the network 100 include a line that is capable of providing the service requested by the subscriber).

When the network 100 includes the line to be tested, the line test engine 102 may send a message, such as the message 152, to the line test gateway 112. The line test gateway 112 may send a notification to one or more of the line test devices 114. The notification may request that a particular one of the line test devices 114 perform a particular test (e.g., a voice frequency (VF) tone test) at a particular location along the line (e.g., between a central office (CO) and a subscriber residence). Other line test devices, of the line test devices 114, may be configured to perform other particular tests at the same location or other locations depending on the test(s) to be performed.

Alternatively, the line test engine 102 may determine, based on the line data, that additional hardware needs to be installed on the network 100 (e.g., when the network 100 does not include the line to be tested) before the test(s) may be performed. The line test engine 102 may generate a notification, such as the notification 174, to one or more of the corrective action systems 176. For example, a particular corrective action system may correspond to a system used to schedule new hardware installations for the network 100. In response to the notification, the particular corrective action system may schedule installation of the additional hardware. After the additional hardware has been installed, the event data 124, the line data 134, or both may be updated (e.g., by the system used to schedule new hardware installations) to indicate that the installation of the new hardware is complete. The line test engine 102 may detect that the event data 124, the line data 134, or both have been updated, and determine whether one or more tests are to be performed on the line.

For example, the line test engine 102 may retrieve the updated event data 124 and/or the updated line data 134, and the test entry 106 and determine whether the criteria 132 associated with the service to be provided to the subscriber are satisfied. When the criteria 132 are satisfied, the line test engine 102 may detect a triggering event 122 and identify one or more tests associated with the triggering event 122 based on the test data 142. In response to identifying the one or more tests, the line test engine 102 may send a message, such as the message 152, to the line test gateway 112. The message may identify the particular line to be tested and the one or more tests associated with the triggering event 122. The line test gateway 112 may then cause one or more of the line test devices 114 to perform the one or more tests.

After a particular test has been performed on the line by one of the line test devices 114, the line test engine 102 may receive a results message, such as the results message 154, from the line test gateway 112. The line test engine 102 may determine whether the particular test passed by comparing information (e.g., a result of the particular test) included in the results message to threshold data 162, as described with reference to FIG. 4. The line test engine 102 may store the results at the results database 184 by sending a results message, such as the results data 182, to the results database 184. The results data may indicate the outcome of the particular test (e.g., whether the line passed or failed the particular test) and may include other information, such as the information included in the results message.

When the line failed the particular test (e.g., when the result of the particular test does not satisfy one or more thresholds specified by the threshold data 162), the line test engine 102 may generate and provide a notification, such as the notification 174, to one or more of the corrective action systems 176. The one or more corrective action systems 176 may then initiate corrective actions, such as reconfiguring a portion of the network 100 or scheduling replacement or installation of hardware of the network 100. The corrective actions correspond to actions predicted to cause the line to pass the particular test upon subsequent testing.

Additionally, or in the alternative, the line test engine 102 may send a message to the line test gateway 112 when the line fails the particular test. For example, the line test engine 102 may determine, based on the subsequent test data 192, that the particular test should be performed again or that one or more additional tests are to be performed on the line. The line test gateway 112 may then cause one or more of the line test devices 114 to re-perform the particular test that failed, to perform additional tests (e.g., tests indicated by the subsequent test data 192), or both. The results of the subsequent tests may be provided to the line test engine 102 via a results message and the line test engine 102 may determine whether the subsequent tests satisfy one or more thresholds based on the threshold data 162.

When the line passed the particular test (e.g., when the result of the particular test satisfies the one or more thresholds specified by the threshold data 162) or passes the subsequent tests, the line test engine 102 may generate and provide a notification to a particular system, such as a service provisioning system (not shown). The notification may indicate that the line is ready to be provisioned to provide the service to the subscriber.

Additionally, changes in the configuration of the network 100 may trigger new or additional tests to be performed in response to particular events or line conditions. For example, an operator of the network may create a new entry at the test configuration database 104. The new entry may correspond to a new trigger 122 (i.e., a new triggering event) that is incorporated into the test entry 106 or may correspond to a new test entry (e.g., a new test entry 106). The new entry may include new criteria, test data, thresholds, actions, and subsequent tests corresponding to the new trigger 122. For example, the network 100 may initially provide service to a first geographic area (i.e., a first market). The operator of the network 100 may subsequently expand the network 100 to provide service to a second geographic area (i.e., a second market). The portion of the network 100 that provides service to the second geographic area may have a different configuration (e.g., include different hardware, software, etc.) than the portion of the network 100 that provides service to the first geographic area. The differences in the configuration of the portion of the network 100 that provides service to the second geographic area may indicate that different tests are performed for similar triggering events or different thresholds may be used to determine whether lines pass a particular test. For example, the line test engine 102 may use first threshold data to determine whether lines of the portion of the network 100 that provides service to the first geographic area have passed a first test and the line test engine 102 may use second threshold data to determine whether lines of the portion of the network 100 that provides service to the second geographic area have passed the first test.

Thus, the line test engine 102 may identify triggering events (e.g., the triggering events 122) based on test entries (e.g., the test entry 106) from the test configuration database 104, based on event data (e.g., the event data 124) from the first database 108, based on line data (e.g., the line data 134) from the second database 110, and the line test engine 102, based on the triggering events, may coordinate or automate line tests on one or more lines of a plurality of lines (e.g., the plurality of lines 116) of a network (e.g., the network 100). Users of the line test engine 102 (e.g., operators of the network 100) are able to simplify configuration of the tests by making entries at the test configuration database 104. Tests may be run automatically in response to entries provided at other databases, such as the first database 108, the second database 110, or both. To illustrate, when a project to install new service at a particular service market is scheduled, information descriptive of the new service to be installed may be provided to the first database 108. For example, information descriptive of a new service installation in a particular area or provisioning of a new service to be provided via existing lines in the particular area may be populated as entries at the first database 108. The line test engine 102 may have access to the first database 108 and may automatically initiate testing of the lines in order to facilitate instillation of the new service.

Figure 2:
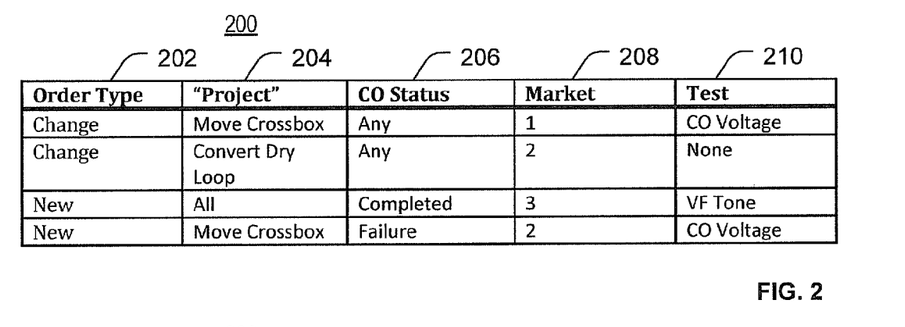
FIG. 2 illustrates a first particular embodiment of a table of a test configuration database.

Referring to FIG. 2, a first particular embodiment of a table from a test configuration database, such as the test configuration database 104, is shown. The table 200 illustrated in FIG. 2 includes information to enable selection of a particular line to be tested and particular tests to be performed on the selected line based on criteria (e.g., the criteria 132). As shown in FIG. 2, the criteria may include a market (e.g., a service region) served by the particular line, a status of a central office (CO) associated with the particular line, a project associated with the particular line, or an order type associated with the particular line. For example, in the embodiment illustrated in FIG. 2, the table 200 includes an order type column 202, a project column 204, a CO status column 206, a market column 208, and a test column 210. In other embodiments, the table 200 may include more columns, fewer columns, or different columns. For example, in a particular embodiment, the table 200 may be combined with other tables that include other information, such as the table 400 of FIG. 4. In another example, information included in the table 200 may be split into two or more different tables.

The order type column 202 may indicate a type of order that is associated with a particular line. The project column 204 may indicate a type of project associated with the particular line. The CO status column 206 may indicate a status of a central office associated with the particular line. The market column 208 may indicate a particular market associated with the particular line. The table 200 also includes the test column 210 that indicates a particular test to be performed when the particular line satisfies criteria indicated by the other columns 202-208 of a particular row of the table 200.

In an embodiment, each row of the table 200 corresponds to a trigger (e.g., a trigger of the set of triggers 122). Each trigger (i.e., each row) is associated with criteria (e.g., the columns 202-208) and is associated with a test (e.g., the test column 210). The columns 202-208 of the table 200 may correspond to the criteria 132 of FIG. 1 and the column 210 of the table 200 may correspond to the tests 142 of FIG. 1.

For example, as indicated by the first row of the table 200, a central office (CO) voltage test may be performed for one or more lines associated with a first market area (e.g., the market column 208 value is "1") when the event data (e.g., the event data 124) indicates that one or more lines are associated with a "change" order type (e.g., the order type column 202 of the first row indicates "Change") and when the one or more lines are associated with a "move crossbox" project (e.g., the project column 204 of the first row indicates "Move Crossbox") regardless of the central office status (e.g., the central office status column 206 of the first row indicates "Any" central office). As another example, as indicated by the second row of the table 200, no tests are performed when the event data (e.g., the event data 124) indicates that lines in a second market area are associated with a "change" order type and a "convert dry loop" project regardless of a central office status.

In another example, as indicated by the third row of the table 200, a VF tone test is performed when the event data (e.g., the event data 124) indicates that lines within a third market area are associated with "completed" central offices (e.g., the central office status column 206 indicates "Completed") and when the lines are associated with "new" order types regardless of a project (e.g., the project column 204 of the third row indicates "All"). As a final example, as indicated by the fourth row of the table 200, a CO voltage test may be performed when the event data (e.g., the event data 124) indicates that lines within the second market area are associated with "New" order types and "Move Crossbox" projects and when a central office status is failure (e.g., the central office status column 206 of the fourth row indicates "Failure").

The embodiment illustrated in FIG. 2 only includes a few of the possible values that may be included in each of the columns 202-210. For example, additional rows (not shown) of the table 200 may include test column 210 values indicating tests other than a CO voltage test or a VF tone test. For example, the other tests may include a line voltage test, a VF noise measurement test, a wideband noise measurement test, a wideband tone measurement test, a spectrum measurement test, a load coils test, a loop length test, a capacitive balance test, a facility voltage test, a facility resistance test, a facility current test, a facility capacitance test, or a combination thereof. Additionally, although only one test is identified in the test column 210 for each row of the table 200, in a particular embodiment, the table 200 may include more than one test column. Thus, in response to detecting a triggering event satisfying the criteria of the particular row, more than one test may be performed on the line(s).

Accordingly, the table 200 illustrates triggering event criteria (e.g., the criteria 132) that enables a line test engine, such as the line test engine 102 of FIG. 1, to identify particular tests to be performed on a particular line based on a market, a central office status, a project identifier, an order type associated with the line, or other factors. As explained above, in other embodiments, the table 200 may include more columns than, or fewer columns than the columns 202-210 illustrated in FIG. 2. For example, a particular test may be associated with a market regardless of a project identifier or a central office status. In another example, each line associated with a particular project may be associated with a particular test regardless of an order type, a central office status, or a market.

Figure 3:
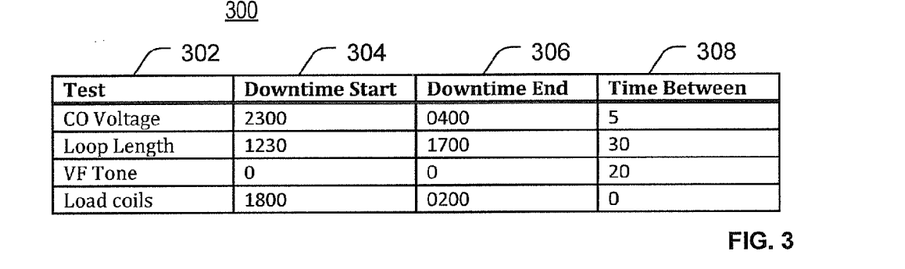
FIG. 3 illustrates another particular embodiment of a table of a configuration database.

Referring to FIG. 3, another particular embodiment of a table 300 of a configuration database, such as the test configuration database 104, is shown. The table 300 illustrates a particular aspect of a test configuration indicating downtime and time between tests associated with a particular test. For example, the table 300 includes a test column 302 identifying particular tests, a downtime start column 304 indicating a start of the downtime associated with each particular test, a downtime end column 306 indicating an end time of a downtime associated with each particular test, and time between column 308 indicating a time (in minutes) between occurrences of implementing each test.

For example, the central office (CO) voltage test is associated with a downtime start 2300 and downtime end of 0400. Thus, from 2300 (i.e., 11:00 pm) to 0400 (i.e., 4:00 am) the CO voltage test is not available to be performed. Further, as indicated in the time between column 308, a five minute period is to elapse between each request for performing the central office voltage test. As another example, the VF tone test is associated with no downtime (e.g., an entry in the downtime start column 304 and an entry in the downtime end column 306 associated with the VF tone test indicate "0"). Thus, the VF tone test is available for testing lines any time of day. The time between column 308 indicates that 20 minutes are to elapse between each request to perform the VF tone test. When tests cannot be implemented immediately (e.g., due to downtime or time required in between tests), the tests may be scheduled using a queue. For example, requests for the tests may be queued at a line test engine (e.g., the line test engine 102) or at a line test gateway (e.g., the line test gateway 112) until a line test device (e.g., one of the line test device(s) 114) is available to perform the test.

Figure 4:
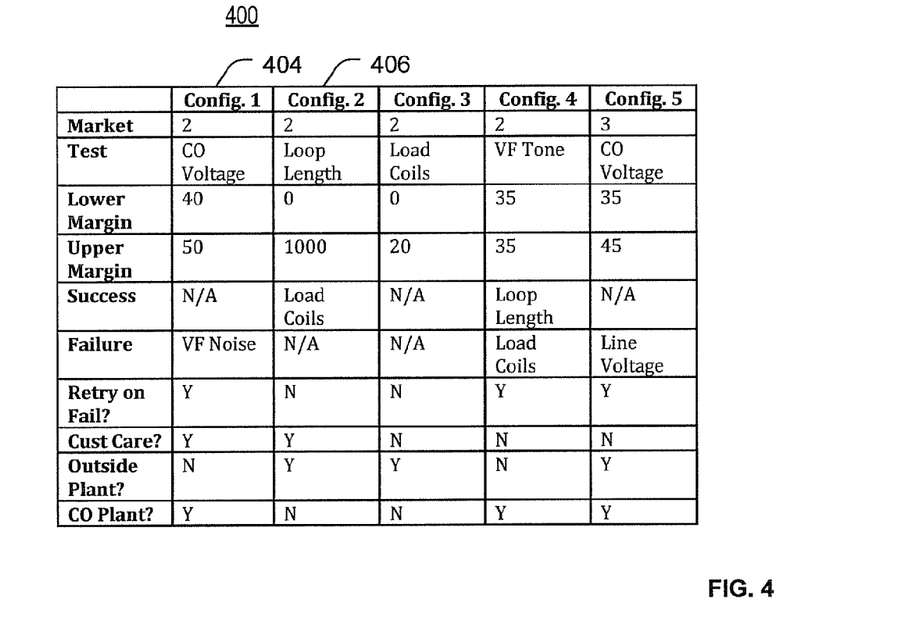
FIG. 4 illustrates another particular embodiment of a table of a configuration database.

Referring to FIG. 4, a particular embodiment of a table 400 of a test configuration database, such as the test configuration database 104, is shown. The table 400 illustrates configurations of particular acceptable margins and actions associated with a particular test and a market area. For example, the table 400 includes a first configuration 404 that is associated with a central office (CO) voltage test in a second market area. The first configuration 404 indicates that an acceptable lower margin (e.g., a minimum acceptable value) for the CO voltage test in the second market is forty (40) volts and that an acceptable upper margin (e.g., a maximum acceptable value) for the CO voltage test is fifty (50) volts. The first configuration 404 also indicates that, when a CO voltage test performed in the second market area passes (e.g., the CO voltage is within the acceptable margins), no additional action (such as an additional test or a corrective action) is taken. When the CO voltage test fails (e.g., the CO voltage is outside the acceptable margins) in the second market, a subsequent test is performed (e.g., a VF noise test). Additionally, the first configuration 404 indicates that the CO voltage test may be retried when the CO voltage test fails. Further, a customer care system and a CO plant system may be notified of the failure. The first configuration 404 also indicates that an outside plant system is not notified of the failure of the CO voltage test.

The table 400 also includes a second configuration 406 associated with performing a loop length test in the second market. The second configuration 406 indicates that the loop length test is not associated with a lower margin but has an upper margin of one-thousand (1000) feet. When the loop length test is passed (i.e., when the loop length is less than or equal to one-thousand (1000) feet), an additional test, identified as a load coils test, may be performed. When the loop length test fails (i.e. when the loop length is greater than one-thousand (1000) feet), no additional action is performed and the loop length test is not retried. A customer care system and an outside plant system may be notified of the failure or success of the loop length test; however, a central office plant is not notified.

The table 400 includes other examples of tests associated with the second market and a third market including a load coils test, a VF tone test, and a central office voltage test. Table 400 illustrates that acceptable margins may be different for different markets. For example, when a CO voltage test is performed in the second market, the CO voltage test has upper and lower margins of fifty (50) and forty (40), respectively, whereas a CO voltage test performed in the third market has upper and lower margins of forty-five (45) and thirty-five (35), respectively.

Additionally, different actions may be taken in different markets depending on the success or failure of a test. For example, the CO voltage test in the second market does not require notification of the outside plant upon failure, whereas, in the third market, the outside plant is notified upon failure of the CO voltage test. As another example, the failure of the CO voltage test in the third market requires a follow up test, such as a line voltage test. However, in the second market a failure of the CO voltage test requires a different follow up test, such as a VF noise test. Thus, tests may be defined to have different acceptable margins and to correspond to different follow up actions in different markets.

The specific values, tests, and actions illustrated in FIG. 4 are merely examples of values, tests and actions that may be identified in the table 400. Other embodiments may include more values, fewer values or different values. For example, the table 400 may include a first upper margin and a second upper margin. In this example, results below the first upper margin may be acceptable, results between the first and second upper margins may indicate a first type of problem (and may be associated with a first set of subsequent actions or tests), and results above the second upper margin may indicate a second type of problem (and may be associated with a second set of subsequent actions or tests). Additionally, in other embodiments, the table 400 may include more tests, fewer tests or different tests; more actions, fewer actions, or different actions, or a combination thereof.

Figure 5:
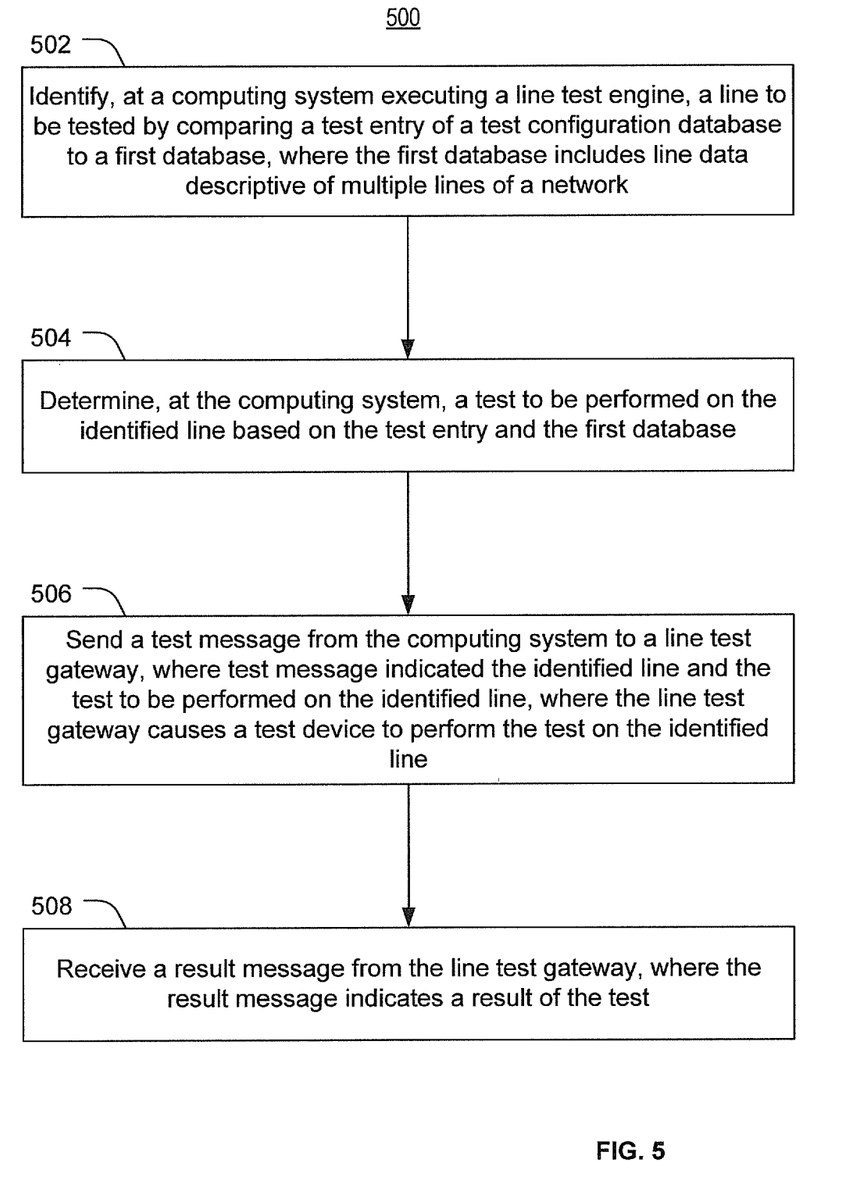
FIG. 5 is a flow chart of a first particular embodiment of a method of automated line testing.

Referring to FIG. 5, a flow chart of a first particular embodiment of a method 500 of automated line testing is shown. The method 500 includes, at 502, identifying, at a computing system executing a test engine, a line to be tested by comparing a test entry of a test configuration database to one or more entries of a first database. The one or more entries of the first database include line data descriptive of multiple lines of a network. For example, the first database may correspond to the first database 108 of FIG. 1 and the test configuration database may correspond to the test configuration database 104 of FIG. 1. The one or more entries of the first database may correspond to event data, such as the event data 124 of FIG. 1.

The method 500 also includes, at 504, determining at the computing system, a test to be performed on the identified line based on the test entry and the one or more entries of the first database. For example, the line test engine 102 may determine a test to be performed on an identified line based on the test configuration data 142, based on the test entry 106, based on the line data 134, and based on the event data 124 from the databases 104, 108, 110.

The method 500 also includes, at 506, sending a test message from the computing system to a line test gateway. The test message indicates the identified line and the test to be performed on the identified line. The line test gateway may cause a test device to perform the test on the identified line. For example, the line test engine 102 of FIG. 1 may send the test message 152 indicating the line to be tested and the test to be performed to the line test gateway 112. The line test gateway 112 may cause one or more of the line test devices 114 to perform a test on a particular line of the plurality of lines 116 in response to the test message 152.

The method 500 may also include, at 508, receiving a result message from the line test gateway. The result message may indicate a result of the test. For example, the line test gateway 112 of FIG. 1 may send a result message 154 to the line test engine 102. The result message 154 may indicate a result, such as a numeric output value, received at the line test gateway 112 from the line test device 114. In a particular embodiment, the method 500 may include evaluating, at the line test engine, the results of the line test(s) based on threshold data (e.g., the threshold data 162) to determine whether a particular line has passed or failed the line test(s) and providing a notification to one or more additional systems based on the evaluation of the results, as described with reference to FIGS. 1, 2, and 4. Thus, the method 500 enables automated testing via notifications to the line test gateway and results evaluation by a line test engine for multiple lines of a subscriber network. Further, the method 500 enables automatic notification to systems of the subscriber network based on the results evaluation.

Figure 6:
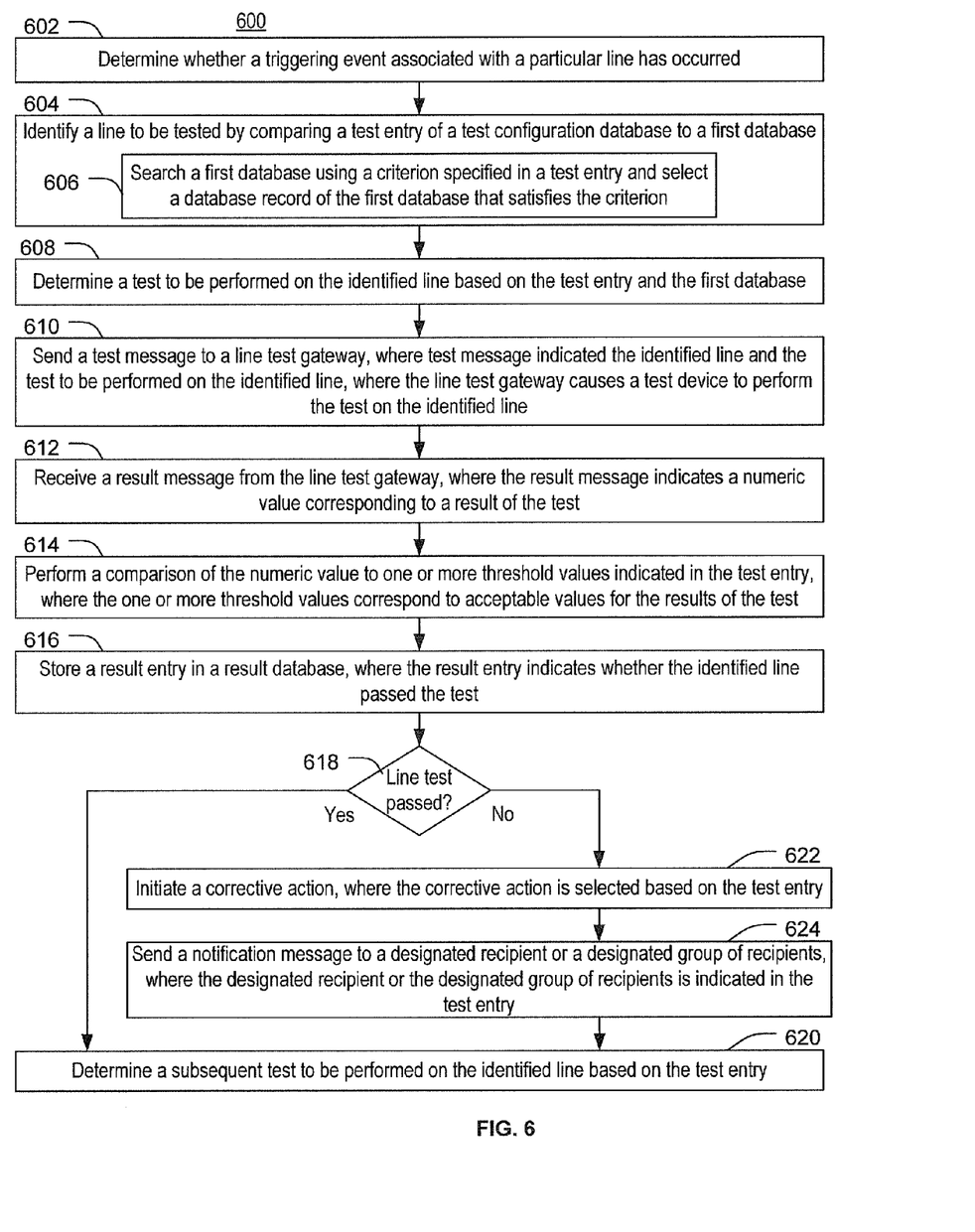
FIG. 6 is a flow chart of a second particular embodiment of a method of automated line testing.

Referring to FIG. 6, a flow chart of a second particular embodiment of a method 600 of automated line testing is shown. The method 600 includes, at 602, determining whether a triggering event associated with a particular line has occurred. The trigger event may correspond to a particular date, a particular time, or both. In another example, the triggering event may correspond to an indication that a particular action has been or is to be performed. The triggering events may be detected by a line test engine, such as the line test engine 102 of FIG. 1. For example, the first database 108 of FIG. 1 may include information indicating when particular actions associated with configurations of a subscriber network are needed or when tests of particular lines of the subscriber network have been performed. The first database 108 may provide information regarding the particular actions to the line test engine 102 as the event data 124. As another example, determining whether the triggering event has occurred may include determining, based on the criteria 132 associated with the triggers 122, whether particular triggering events have occurred. To illustrate, the line test engine 102 may retrieve the test entry 106 that includes the table 200 of FIG. 2. The table 200 may identify a set of triggers (i.e., each row of the table 200 may correspond to a trigger of the set of triggers 122), the criteria 132 (e.g., the columns 202-208 of the table 200), and the tests 142 (e.g., the column 210 of the table 200) and may retrieve event data (e.g., the event data 124) from a database (e.g., the first database 108). When the event data satisfies the criteria 132 associated with a particular trigger, the line test engine 102 may detect a triggering event.

The method 600 may also include, at 604, identifying a line to be tested by comparing a test entry of a test configuration database to a first database. The first database may include line data descriptive of multiple lines of a network. In a particular embodiment, identifying a line to be tested may include, at 606, searching the first database using criteria specified in the test entry, and selecting a database record in the first database that satisfies the criteria. For example, the line test engine 102 may search the first database 108, the second database 110, or both, using the criteria 132 specified in the test entry 106 to identify lines to be tested. For example, table 200 of FIG. 2 indicates that a central office (CO) voltage test should be performed for lines in the first market area associated with a "Move Crossbox" project and a "Change" order type.

The method 600 may also include, at 608, determining a test to be performed on the identified line based on the test entry and the first database. For example, the line test engine 102 may determine a particular test to be performed based on test configuration data 142 of the test entry 106 and based on the line data 134, the event data 124, or both. In a particular embodiment, the test to be performed for a particular triggering event may be determined based on the test identified in the test column 210 for a particular row of the table 200 corresponding to the triggering event, as described with reference to FIG. 2.

The method 600 may also include, at 610, sending a test message to a line test gateway. The test message may be sent to the line test gateway from the line test engine and may indicate the identified line and the test to be performed on the identified line. The line test gateway may cause a test device to perform the test on the identified line. For example, the line test engine 102 may send the test message 152 to the line test gateway 112. The test message 152 may include information identifying the line of the plurality of lines 116 to be tested and a test to be performed. The line test gateway 112 may cause one or more line test devices 114 to perform the test on the identified line.

The method 600 may also include, at 612, receiving a result message from the line test gateway. In a particular embodiment, the result message indicates a numeric value corresponding to the result of the test. For example, the line test engine 102 of FIG. 1 may receive a result message 154 from the line test gateway 112. The result message 154 may include a result of the line test such as numeric output value provided by the line test device 114.

The method 600 may also include, at 614, performing a comparison of the numeric value to one or more threshold values indicated by the test entry. The one or more threshold values may correspond to acceptable values for the results of the test. For example, the line test engine 102 may compare results from the result message 154 to one or more thresholds of the threshold data 162 from the test entry 106. The line test engine 102 may determine whether the results are within acceptable margins based on the threshold data 162. In a particular embodiment, the one or more thresholds may be determined based on information stored in a table, such as the table 400 of FIG. 4. For example, the thresholds may correspond to the lower margin and the upper margin described with reference to FIG. 4.

The method 600 may also include, at 616, storing a result of the test in a result database. A result entry may indicate whether the identified line passed the test, the numeric value, or other information descriptive of the test performed and the results. When the line test is passed, at 618, the method 600 may proceed to 620. When the line test is not passed, at 618, (e.g. when one or more threshold values are not satisfied), the method 600 may include, at 622, initiating a corrective action. The corrective action may be selected based on the test entry. For example the line test engine 102 of FIG. 1 may initiate a corrective action based on action data 172 identified in the test entry 106.

The method 600 may also include, at 624, sending a notification message to a designated recipient or designated group of recipients. The designated recipient or designated group of recipients may be indicated in the test entry. For example, the line test engine 102 of FIG. 1 may send a notification message 174 to a corrective action system 176 or to one or more designated recipients indicated in the action data 172. In a particular embodiment, the designated recipient or the designated group of recipients may be indicated by the table 400.

Whether the line test passed or did not pass, the method 600 may also include, at 620, determining a subsequent test to be performed on the identified line based on the test entry. For example, the line test engine 102 of FIG. 1 may determine whether one or more additional tests are to be performed on the identified line based on subsequent test data 192. When one or more tests are to be performed, the line test engine 102 may select a new test to perform at 140. When no more tests are to be performed on the identified line, the line test engine 102 may identify a new line to test, at 130. In a particular embodiment, the subsequent test data 192 may correspond to the table 400 and the one or more additional tests may include retrying the test, initiating a second test, or both.

Accordingly, embodiments described herein with reference to FIGS. 1-6 enable automated testing of lines based on test configuration data in a test configuration database. Further, the embodiments described herein enable logging of results of the testing of the lines in a database and conditionally performing additional testing of the lines based on a result of a particular test. Additionally, the embodiments described herein enable sending a notification to designated groups based on test results.

Figure 7:
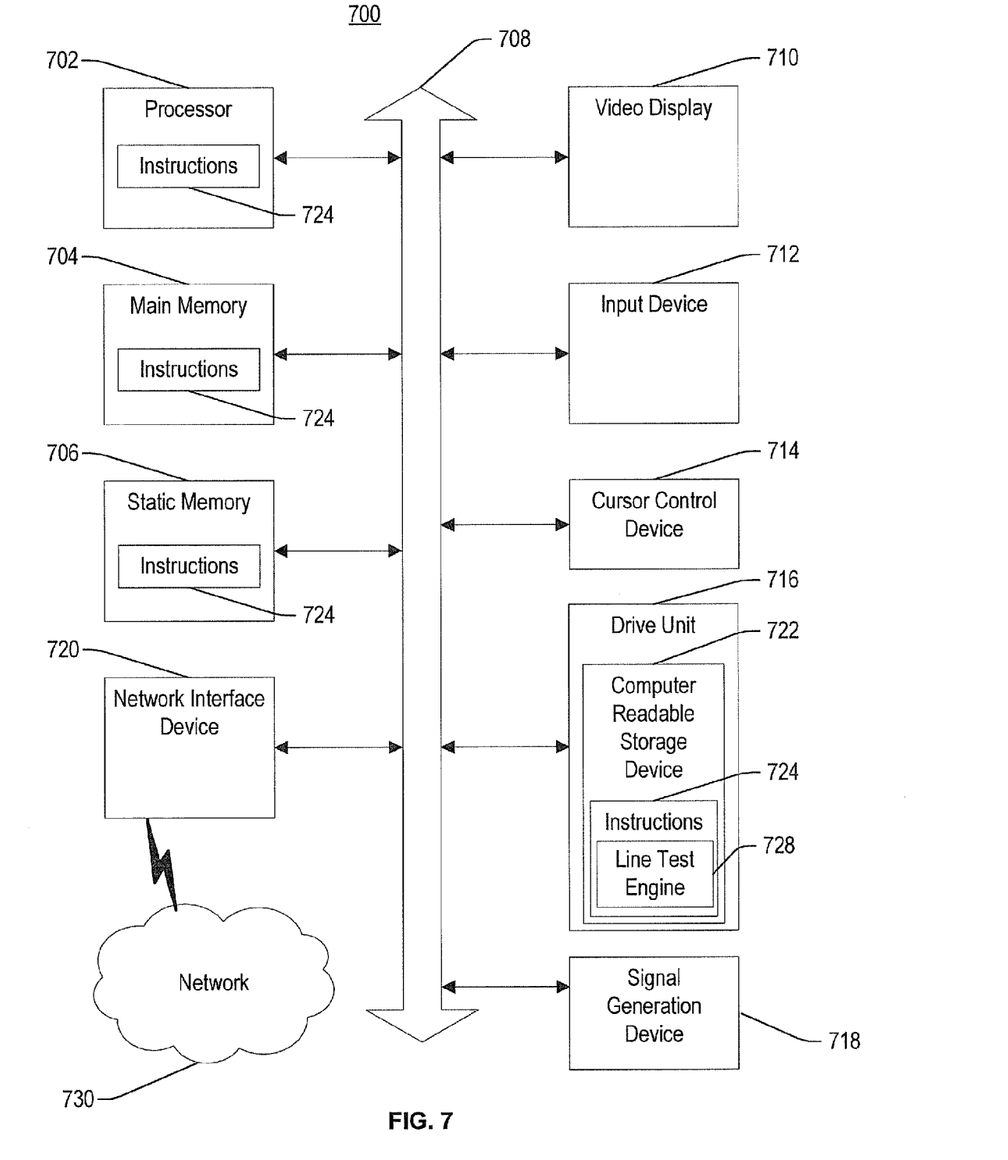
FIG. 7 is an illustrative embodiment of a general computer system for monitoring and testing lines of a network.

Referring to FIG. 7, an illustrative embodiment of a general computer system for monitoring and controlling testing of lines of a network is shown and is designated 700. The computer system 700 may include a set of instructions that can be executed to cause the computer system 700 to perform any one or more of the functions, operations, or methods described with reference to FIGS. 1-6 or computer based functions disclosed herein. The computer system 700 may operate as a standalone device or may be connected, e.g., using a network, to other computer systems or peripheral devices. Additionally, the computer system 700 may include, be included with, correspond to, or implement a line test engine (e.g., the line test engine 102 of FIG. 1) and may perform the functions, operations, and methods described with reference to FIGS. 1-6.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a personal digital assistant (PDA), a mobile device, a laptop computer, a desktop computer, a communications device, a wireless telephone, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 may include a main memory 704 and a static memory 706, which can communicate with each other via a bus 708. As shown, the computer system 700 may further include a video display unit 710, such as a liquid crystal display (LCD), a flat panel display, a solid state display, or a lamp assembly of a projection system. Additionally, the computer system 700 may include an input device 712, such as a keyboard, and a cursor control device 714, such as a mouse. The computer system 700 may also include a drive unit 716, a signal generation device 718, such as a speaker or remote control, and a network interface device 720. Some computer systems 700 may not include an input device and/or may not include a video display unit (e.g., a server may not include an input device and/or a video display unit).

In a particular embodiment, as depicted in FIG. 7, the drive unit 716 may include a computer-readable storage device 722 in which one or more sets of instructions 724, e.g. software, can be embedded. Further, the instructions 724 may embody one or more of the methods or logic as described herein with reference to FIGS. 1-6. For example, the instructions 724 may include line test engine instructions 728 that are executable by the processor 702 to perform operations described herein as performed by a line test engine (e.g., the line test engine 102). In a particular embodiment, the instructions 724 may reside completely, or at least partially, within the main memory 704, the static memory 706, and/or within the processor 702 during execution by the computer system 700. The main memory 704 and the processor 702 also may include computer-readable storage devices. The instructions 724 in the drive unit 716, the main memory 704, the static memory 706, the processor 702, or combinations thereof may include a line test engine 728.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage device 722 that stores instructions 724 or receives, stores, and executes instructions 724, so that a device connected to a network 730 may communicate data over the network 730. While the computer-readable storage device is shown to be a single device, the term "computer-readable storage device" includes a single device or multiple devices, such as a centralized or distributed database, and/or associated caches and servers that store one or more sets of instructions. The term "computer-readable storage device" shall also include any medium that is capable of storing a set of instructions for execution by a processor or that device a computer system to perform any one or more of the methods or operations disclosed herein.

In a particular non-limiting, exemplary embodiment, the computer-readable storage device may include a solid-state memory such as a memory card or other package that houses one or more non-volatile read-only memories. Further, the computer-readable storage device may be a random access memory or other volatile re-writable memory. Additionally, the computer-readable storage device may include a magneto-optical or optical medium, such as a disk or tapes or other storage device. Accordingly, the disclosure is considered to include any one or more of a computer-readable storage device and other equivalents and successor media, in which data or instructions may be stored.

Although the present specification describes components and functions that may be implemented in particular embodiments with reference to particular standards and protocols, the disclosed embodiments are not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    identifying, at a computing system executing a line test engine, a line to be tested by comparing a test entry of a test configuration database to a first database, wherein the first database includes line data descriptive of multiple lines of a network;
    determining, at the computing system, a test to be performed on the line based on the test entry;
    sending a message from the computing system to a line test controller, wherein message indicates the line and the test to be performed on the line, wherein the line test controller causes a test device to perform the test on the line; and
    receiving a result message from the line test controller, wherein the result message indicates a result of the test.

2. The method of claim 1, wherein the result is indicated as a numeric value, and further comprising:
    performing a comparison of the numeric value to a threshold range indicated in the test entry, wherein the threshold range corresponds to acceptable values for the results of the test; and
    determining whether the line passed the test based on the comparison.

3. The method of claim 2, further comprising storing a result entry in a result database, wherein the result entry indicates whether the line passed the test.

4. The method of claim 2, further comprising, in response to determining that the line did not pass the test, initiating a corrective action, wherein the corrective action is selected based on the test entry.

5. The method of claim 2, further comprising, in response to determining that the line did not pass the test, sending a notification message to a designated recipient or a designated group of recipients, wherein the designated recipient or the designated group of recipients is indicated in the test entry.

6. The method of claim 2, further comprising, in response to determining that the line passed the test, determining a subsequent test to be performed on the line based on the test entry.

7. The method of claim 2, further comprising, in response to determining that the line did not pass the test, determining a subsequent test to be performed on the line based on the test entry.

8. The method of claim 7, wherein the test is configured to identify a problem related to the line and the subsequent test is configured to determine a source or location of the problem.

9. The method of claim 7, wherein the test and the subsequent test relate to a common characteristic of the line.

10. The method of claim 7, wherein the test and the subsequent test relate to distinct characteristic of the line.

11. The method of claim 1, wherein the result is indicated as a numeric value, and further comprising:
    performing a comparison of the numeric value to a first threshold value and a second threshold value indicated in the test entry;
    when the numeric value satisfies the first threshold value and does not satisfy the second threshold value, selecting a first subsequent test to be performed on the line based on the test entry; and
    when the numeric value satisfies the first threshold value and satisfies the second threshold value, selecting a second subsequent test to be performed on the line based on the test entry, wherein the first subsequent test is distinct from the second subsequent test.

12. The method of claim 1, wherein identifying the line to be tested includes determining whether a triggering event associated with a particular line has occurred, wherein determining whether the triggering event has occurred includes determining whether event data stored at the first database satisfies criteria associated with the triggering event, and wherein the criteria are indicated by the test entry.

13. The method of claim 12, wherein the triggering event corresponds to a particular date, a particular time, a modification to a network, an addition to the network, or a combination thereof.

14. The method of claim 12, wherein the triggering event corresponds to an indication that a particular action has been performed.

15. The method of claim 14, wherein determining whether the triggering event has occurred includes searching a second database for information related to the particular action.

16. A system comprising:
    a processor; and
    a memory comprising instructions executable by the processor to cause the processor to perform operations comprising:
        identifying a line to be tested by comparing a test entry of a test configuration database to a first database, wherein the first database includes line data descriptive of multiple lines of a network;
        determining a test to be performed on the line based on the test entry;
        sending a message to a line test controller, wherein message indicates the line and the test to be performed on the line, and wherein the line test controller causes a test device to perform the test on the line; and
        receiving a result message from the line test controller, wherein the result message indicates a result of the test.

17. The system of claim 16, wherein identifying the line to be tested includes searching the first database using a criterion specified in the test entry and selecting a database record of the first database that satisfies the criterion, and wherein the database record includes a line identifier of the line.

18. The system of claim 17, wherein the criterion includes a project identifier.

19. The system of claim 17, wherein the criterion includes a line status identifier.

20. A computer-readable storage device storing instructions executable by a processor to cause the processor to perform operations comprising:
    identifying a line to be tested by comparing a test entry of a test configuration database to a first database, wherein the first database includes line data descriptive of multiple lines of a network;
    determining a test to be performed on the line based on the test entry;

sending a message to a line test controller, wherein the message indicates the line and the test to be performed on the line, and wherein the line test controller causes a test device to perform the test on the line; and receiving a result message from the line test controller, wherein the result message indicates a result of the test.

* * * * *